United States Patent
Berryman

(10) Patent No.: US 6,272,976 B1
(45) Date of Patent: Aug. 14, 2001

(54) POULTRY STEAMER

(76) Inventor: Paul Berryman, P.O. Box 3563, El Centro, CA (US) 92244

( * ) Notice: Subject to any disclaimer, the term of this patent is extended or adjusted under 35 U.S.C. 154(b) by 0 days.

(21) Appl. No.: 09/779,140

(22) Filed: Feb. 8, 2001

(51) Int. Cl.[7] ............................. A47J 37/00; A47J 37/04; A47J 43/18
(52) U.S. Cl. .................. 99/340; 99/345; 99/347; 99/417; 99/418; 99/426; 99/446
(58) Field of Search ..................... 99/339, 400, 340, 99/401, 345–347, 419–421 V, 426, 444–450, 415–418; 426/523, 509; D7/409

(56) References Cited

U.S. PATENT DOCUMENTS

| | | | |
|---|---|---|---|
| D. 347,143 | 5/1994 | Awyong | D7/403 |
| 3,713,378 | 1/1973 | West et al. | 99/346 |
| 3,922,960 | 12/1975 | Lewis | 99/346 |
| 4,557,188 * | 12/1985 | Spanek | 99/415 |
| 4,633,773 * | 1/1987 | Jay | 99/426 |
| 4,709,626 * | 12/1987 | Hamlyn | 99/345 X |
| 5,069,117 * | 12/1991 | Schlessel | 99/419 |
| 5,081,916 * | 1/1992 | Kuhling et al. | 99/419 |
| 5,106,642 * | 4/1992 | Ciofalo | 426/509 |
| 5,301,602 | 4/1994 | Ryczek | 99/345 |
| 5,501,142 * | 3/1996 | Bailey | 99/345 X |
| 5,538,050 * | 7/1996 | Galdon | 99/426 X |
| 5,662,028 * | 9/1997 | Fraga | 99/419 |
| 5,791,235 * | 8/1998 | Anselmo | 99/426 |
| 5,842,409 * | 12/1998 | Loffler | 99/426 X |
| 6,062,131 | 5/2000 | Holland | 99/345 |
| 6,119,585 | 9/2000 | Guidry | 99/345 |
| 6,125,739 | 10/2000 | Jernigan | 99/345 |

* cited by examiner

Primary Examiner—Timothy F. Simone
(74) Attorney, Agent, or Firm—Frank G. Morkunas

(57) ABSTRACT

A poultry steamer having a base with a floor and an upstanding perimeter wall; an upwardly projecting removable support member on the floor for receiving and supporting poultry; a contourable ante base above the floor; a non-porous contourable protective shield above the ante base; and a removable cover, with a removable handle mechanism, fitting over the support member and contourably onto the ante base thereby defining a sealed chamber inside the cover for housing the poultry and defining an open space between the cover and the upstanding perimeter wall.

12 Claims, 1 Drawing Sheet

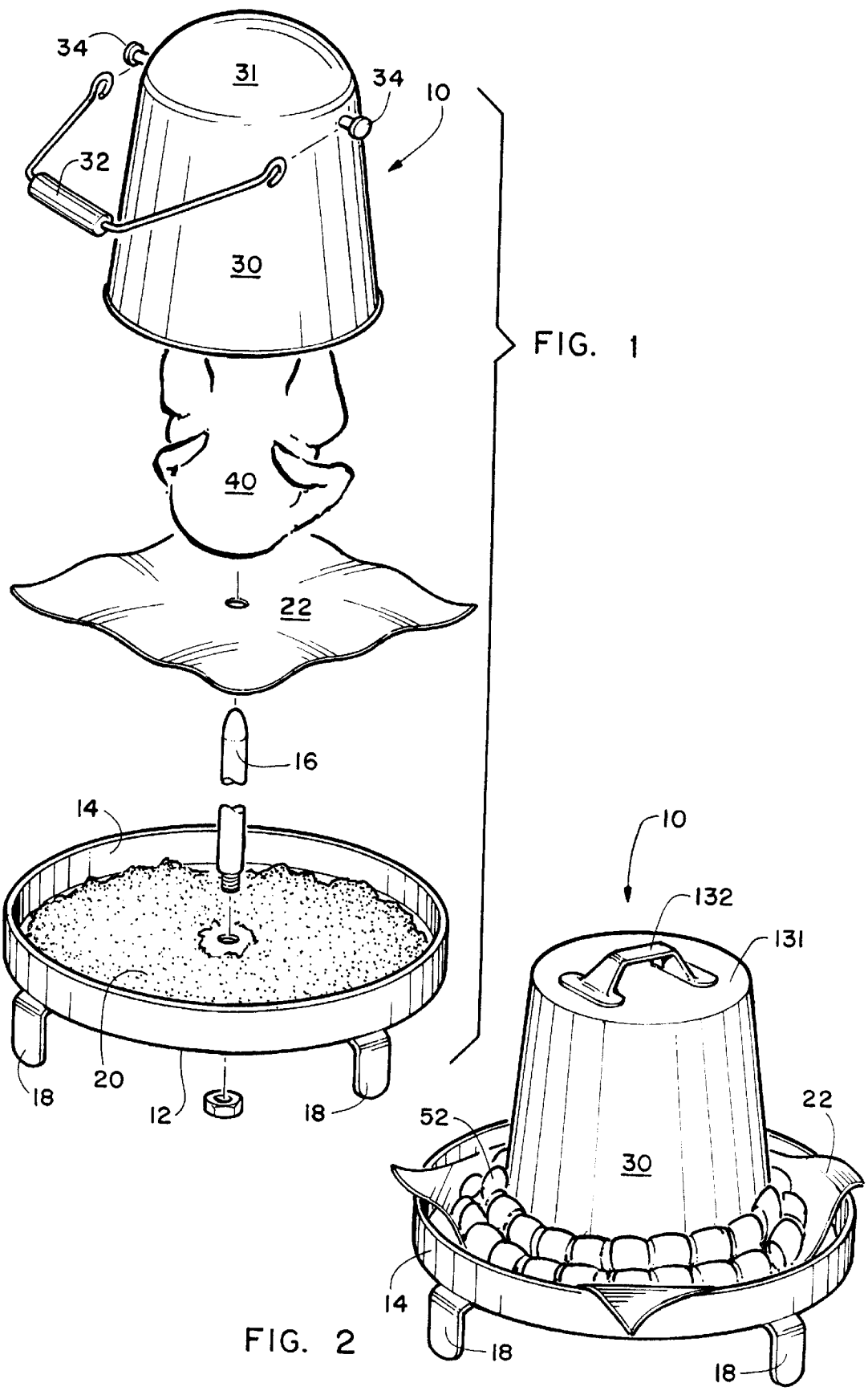

POULTRY STEAMER

CROSS REFERENCES TO RELATED APPLICATIONS

None.

STATEMENT REGARDING FEDERALLY-SPONSORED RESEARCH OR DEVELOPMENT

Not applicable.

BACKGROUND OF THE INVENTION

This present invention relates to an improvement in cookers, and more particularly to poultry cookers which cook poultry by self-generated steam.

Currently numerous patents exist for cooking poultry, for basting poultry, for smoking poultry, for roasting poultry, and for otherwise enhancing the flavor of poultry [and other cookable meat products]. These generally involve some form of pan or pan-like object and many include a support member either for the poultry or for some other object, such as a fluid-releasing basting plate and the like. Some include a support member which, not only supports the poultry to be cooked, but ingeniously provides for an aid in cooking by being hollowed and having apertures to, not only aid in cooking, but to add flavor to the product. Some are just support stands. All which generally aid in cooking are complex. Those which are merely support stands could, but generally don't aid in cooking. None, as configured, function as the cooker. A recent trend envisions cooking turkeys by deep frying with a claim of better taste and faster cooking times. The taste of deep-frying fat is left the subjective palates of the beholder; faster cooking, however, is a result of deep-frying. With deep-frying also comes the negative nutritional values associated with cooking with fatty oils.

The present invention embodies a simple process of cooking coupled with a rather unique yet simple structure which steams the poultry using the steam generated from the juices of the poultry as it heats and cooks. The self-generated juice-flavored steam is contained within the device, does not evaporate during the cooking process, and recirculates. The result is that large poultry, such as a 25-pound turkey for example, cooking by its own self-generated juice-flavored steam, is completely cooked in about two hours. Because of how it was cooked, it is succulent and healthy.

Accordingly, several objects and advantages of my invention are to:

a. provide a simple, low-cost, and portable poultry cooking device which can be easily disassembled, re-assembled, and used virtually anywhere and at anytime;

b. foster more healthy cooking means;

c. provide a poultry cooking device which is easy to manufacture and easy to use;

d. permit one to cook large poultry without constant attention or vigilance while cooking; and e. conserve resources by decreasing cooking times for large poultry.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a poultry steamer having a base with a floor and an upstanding perimeter wall; an upwardly projecting removable support member on the floor for receiving and supporting poultry; a contourable ante base above the floor; a non-porous contourable protective shield above the ante base; and a removable cover, with a removable handle mechanism, fitting over the support member and contourably onto the ante base thereby defining a sealed chamber inside the cover for housing the poultry and defining an open space between the cover and the upstanding perimeter wall.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is an exploded perspective view of one embodiment of the cooker.

FIG. 2 is a perspective view of another embodiment of the cooker.

DETAILED DESCRIPTION OF THE INVENTION

Referring now to the drawings in detail and in particular to FIG. 1, reference character 10 generally designates a poultry cooker/steamer constructed in accordance with a preferred embodiment of the present invention. It primarily consists of a base or platform 12 with an upstanding outer perimeter 14 which defines a wall around the base 12. The floor of the base 12 consists of a removable contourable ante-base 20; i.e., a secondary or upper base above the base 12. Contourability and pliability of the ante-base 20 is an important feature of the present invention as will be explained below. It must be understood that the ante-base 20 should generally have a higher flash point than the amount of heat to be generated by an external heating element which will be applied to the cooker 10 after it has been readied for cooking. Approximately centered in the base 12 is a support member 16. Support member 16 may be permanently fixed into the base 20 or, as illustrated, it may be removable.

Removability is preferred. The support member 16 may be friction-fit into the base 12 or, as illustrated, it may have a threaded end which screws directly into cooperating threading in the base 12 floor, it or may be held thereat by use of a cooperating nut.

The ante-base 20 must be contourable such that, when the cover 30 is placed thereon, the ante-base yields to the contact of the lower rim of the cover 30 creating a mating fit between the cover 30 and the ante-base 20. To this end, the ante-base should be composed of a granular-like material, such as, but not limited to sand, silicon-like compositions, fine pebbles, and the like. Sand, due to its abundance and relative inexpense provides an excellent ante-base 20. The support member 16 functions to vertically support, in a neck-to-rear relationship, the poultry 40 to be cooked by the present invention and the keep the poultry 40 from falling on its side.

Poultry 40 is placed onto the support member 16 via a cavity (neck or rear) of the poultry 40 to be cooked and, if the respective cavities are not in communication with one another (for example, if the poultry is not completely thawed therein), comes to rest on the top of the support member 16 where the cavity region is frozen shut. In this regard, the support member 16 should, but need not be, sufficiently tall such that, when poultry 40, like a large, slightly frozen, turkey for example, is placed and supported thereon, the neck-region or the legs (depending on how the turkey 40 is placed on the support member 16) do not touch the ante-base 20. In this situation, the turkey 40 'hangs' on the support member 16 and is not in touching communication with the ante-base 20. The reason for this non-communication obviously is to keep any particles of the ante-base 20 from adhering to, and/or 'contaminating' the turkey 40. Once the cooking process begins, the inner frozen portion of the turkey thaws and the cavity regions (neck and rear) communicate with one another, the turkey 40 will generally slide down the support member 16 and come into contact with the ante-base 20. To further ensure against contamination of the turkey 40 by particles of the ante-base 20, a protective shield 22 inserts over the support member 16 and onto the ante-base 20 before the turkey 40 is placed on the support member 16. Generally, if a fresh turkey 40, or a fully thawed turkey 40, is being placed onto the support member 16, the support member 16 will generally slide through the turkey 40 from one cavity to the other.

The surface area of the protective shield 22 should be large enough to fully accommodate the cover 30 when the cover 30 is placed thereon such that the cover 30 does not, will not breach the surface area of the protective shield 22. The protective shield 22 is a barrier between the turkey 40 and the ante-base 20 and aids in preventing steam loss during the cooking process. Generally the protective shield 22 should also be of a contourable, and basically non-porous material such as, but not limited to, metal foil-like wrap (aluminum foil for example). Non-porous qualities prevent juices from the turkey 40 from being absorbed by the shield 22 as the turkey 40 cooks and, as a result, prevents steam loss and enhances flavor and decreases cooking time. Contourability is essential so that the fit between the cover 30 and the ante-base 20 is maintained which also, thereby prevents steam loss, enhances flavor, and decreases cooking time. After the turkey 40 is placed over the support member 16 and resting thereon (if frozen) or being supported thereat (if generally thawed), the cover 30 (with an open bottom and a closed top 31) is placed over the turkey 40, and is firmly/matingly pressed down onto the protective shield 22 and ante-base 20. The top 31 can be dome-shaped as shown in FIG. 1 or may be flat-like as shown in FIG. 2. To better ensure a good 'mating', turning the cover 30 slightly to the left and then slightly to the right (or vice versa) facilitates the mating and produces the desired result. A firm downward 'push' of the cover 30 into the ante-base 20 generally produces a similar result.

The cover 30 and the base 12 and its upstanding wall 14 should be configured such that, after the cover 30 is placed onto the protective shield 22, there should then exist an open space between the outer perimeter of the cover 30 and the wall 14. This open space should be at least two inches or more. The open space should be sufficient to accommodate an external heat source as will be explained below. Once so covered, an external heat source is applied to the cover 30. It should be noted here that it is preferred that the cover 30 be comprised of a heat-conductive material; preferably a suitable metal composition. The interior of the cover 30 should be sufficiently wide and tall to encompass all of the poultry to be housed and cooked therein; yet not too wide that its perimeter extends beyond the protective shield 22 or that it not establish an open space as described above. It is also important that the interior chamber of the cover 30 where the turkey 40 rests also fits within the protective shield 22 and does not extend over and onto the ante-base 20. Though it could so extend, this would significantly defeat the function of the present invention, cause a loss of turkey juices as the turkey 40 cooks, cause a loss of steam thereby, and increase the cooking time. A handle mechanism 32, 34, preferably removable, is adjacent to the top of the cover 30. The handle mechanism 32, 34 is suited for removing the cover 30, which will be very hot, shortly after the turkey 40 has been cooked.

FIG. 2 illustrates the configuration of the present invention during the cooking process and also demonstrates another embodiment of the handle mechanism 132 which is seated directly on the top 31 of the cover 30. With the poultry 40 on the support member 16 and inside the cover 30, a suitable external heating element is placed into contact with the exterior surface of the cover 30. Any type of heating element will suffice provided it can generate sufficient heat to cook the poultry 40 which is inside the cover 30. For mobility and versatility, however, it is preferred that charcoal 52, or similar material be used. FIG. 2 illustrates the use of charcoal 52.

Typically, a first layer of charcoal 52 is placed in a row in the open space and directly around the outer perimeter of the cover 30 and directly on the protective shield 22. This first layer should come into contact with and touch the exterior surface of the cover 30. A second row of charcoal 52 is placed next to the first row of charcoal 52 around the outer perimeter formed by the first row of charcoal 52. The first layer of charcoal, therefore, consists of at least two rows of charcoal. A second layer of charcoal 52 is placed on top of the first layer, first row of charcoal 30. This second layer of charcoal also generally should touch the exterior surface of the cover 30. In cases where the cooker 10 is configured generally for charcoal 52 use, the open space as defined above should be about three to four or more inches. The charcoal 52 is ignited and, approximately two hours thereafter, the poultry 40 within the cooker 10, regardless of its size, is completed cooked.

The cooking process is as follows. After the heating element (charcoal 52 by way of the above example) generates heat, it causes the inner chamber of the cover 30 (where the poultry 40 rests) to become very hot. The dry heat begins to cook the poultry 40. As the poultry 40 cooks it begins to shed its juices. The juices fall to the protective shield 22. The heat within the inner chamber converts the liquid juices to steam. The steam rises and fills the inner chamber but has no viable outlet. It is the juice-generated steam which cooks the turkey 40. Because it is juice-generated, it also 'bastes' the turkey with its natural juices in the process. This process continues completely cooking the turkey 40 within about two hours. The mating seal between the cover 30 and the protective shield 22 (and ante-base 20) is not a completely air-tight seal. Steam will escape over time. But the seal is sufficiently 'tight' to retain a majority of the steam to cook the turkey within. Cooking poultry, particularly large poultry, in this manner greatly decreases the time in which it takes to cook such conventionally and, it is done 'naturally'; i.e., cooked, and basted, by its own juices. The final result is a healthy product done in a greatly reduced time.

When the product is cooked, the cover 30 is lifted, and the poultry 40 within is removed. FIG. 1 illustrates a removable handle mechanism 32, 34. It consists of a bail-like handle 32 having loops at each of its ends. The loops attach to rods 34 which project outward from the cover 30 at or near its top. After the handle 32 is attached to the cover 30, the cover may be easily removed. Once the cover 30 is removed from the cooker 10, the bail-like handle 32 may be disengaged from the rods 34. Another embodiment (not shown) has the loops turned slightly inward while the rods 34 have ends which are turned slightly downward. FIG. 2 illustrates a different embodiment of the handle mechanism 132. Here the handle 132 is placed directly on the top 31 of the cover 30 for ease of removal of the cover 30 from the cooker 10.

The cooker 10 is illustrated to have a plurality of legs 18 supporting it--at least three legs 18 are preferred. The legs 18 should, but need not be, removable. Removability fosters storage and mobility of the cooker 10. Where removable, the legs 18 may be friction-fit into the base 12, or may be screwed in using conventional screws or nut-and-bolt combinations.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not by the embodiment[s] illustrated, but by the appended claims and their legal equivalents.

The invention claimed is:

1. A poultry steamer comprising:

a base having a floor and an upstanding perimeter wall;

a support member on said floor projecting upward;

a contourable ante base above said floor;

a shield above said ante base; and a removable cover fitting over said support member and fitting contourably onto said ante base thereby defining a sealed chamber inside said cover and further defining an open space between said cover and said upstanding perimeter wall on said ante base.

2. The invention as defined in claim 1 wherein said support member is removable from said floor.

3. The invention as defined in claim 2 further comprising a threaded bottom end on said support member and a corresponding threaded aperture on said floor adapted to receive the threaded bottom end of said support member.

4. The invention as defined in claim 1 wherein said contourable ante base is removable.

5. The invention as defined in claim 1 wherein said contourable ante base comprises a granular material.

6. The invention as defined in claim 1 wherein said shield is removable.

7. The invention as defined in claim 1 wherein said shield is comprised of a non-porous material.

8. The invention as defined in claim 1 wherein said shield is comprised of a pliable material.

9. The invention as defined in claim 1 further comprising at least three legs on said base.

10. The invention as defined in claim 9 wherein said at least three legs are removable from said base.

11. The invention as defined in claim 1 further comprising a handle on said cover.

12. The invention as defined in claim 11 wherein said handle is removable.

* * * * *